(12) United States Patent
Wang et al.

(10) Patent No.: US 8,392,535 B2
(45) Date of Patent: Mar. 5, 2013

(54) METHOD, DEVICE AND SYSTEM FOR CONTROLLING MULTICHANNEL CASCADE BETWEEN TWO MEDIA CONTROL SERVERS

(75) Inventors: Enkui Wang, Shenzhen (CN); Qingfeng Chen, Shenzhen (CN); Lingfeng Xu, Shenzhen (CN)

(73) Assignee: Huawei Device Co., Ltd., Shenzhen, Guangdong (CN)

( * ) Notice: Subject to any disclaimer, the term of this patent is extended or adjusted under 35 U.S.C. 154(b) by 73 days.

(21) Appl. No.: 13/215,854

(22) Filed: Aug. 23, 2011

(65) Prior Publication Data

US 2011/0307585 A1    Dec. 15, 2011

Related U.S. Application Data

(63) Continuation of application No. PCT/CN2010/070662, filed on Feb. 11, 2010.

(30) Foreign Application Priority Data

Feb. 23, 2009 (CN) .......................... 2009 1 0006999
Mar. 31, 2009 (CN) .......................... 2009 1 0133802

(51) Int. Cl.
 *G06F 15/16* (2006.01)
 *G06F 12/00* (2006.01)
(52) U.S. Cl. ........................................ 709/219; 709/227
(58) Field of Classification Search .................. 709/219, 709/223–229, 245
See application file for complete search history.

(56) References Cited

U.S. PATENT DOCUMENTS

| | | | |
|---|---|---|---|
| 6,728,238 B1* | 4/2004 | Long et al. | 370/352 |
| 2003/0156603 A1* | 8/2003 | Rakib et al. | 370/485 |
| 2004/0228327 A1 | 11/2004 | Punjabi et al. | |
| 2005/0058097 A1* | 3/2005 | Kang et al. | 370/329 |
| 2007/0076728 A1* | 4/2007 | Rieger et al. | 370/401 |
| 2007/0206089 A1 | 9/2007 | Eshkoli et al. | |
| 2008/0215777 A1* | 9/2008 | Richenstein et al. | 710/69 |
| 2011/0085019 A1 | 4/2011 | Li et al. | |

FOREIGN PATENT DOCUMENTS

| | | |
|---|---|---|
| CN | 1516463 A | 7/2004 |
| CN | 1630293 A | 6/2005 |
| CN | 1885785 A | 12/2006 |
| CN | 1968119 A | 5/2007 |

(Continued)

OTHER PUBLICATIONS

Written Opinion of the International Searching Authority issued in corresponding PCT Patent Application No. PCT/CN2010/070662, mailed May 20, 2010.
International Search Report issued in corresponding PCT Patent Application No. PCT/CN2010/070662, mailed May 20, 2010.

(Continued)

*Primary Examiner* — Zarni Maung
(74) *Attorney, Agent, or Firm* — Brinks Hofer Gislon & Lione

(57) ABSTRACT

The embodiments of the present invention disclose a method, a device, and a system for controlling multichannel cascade between two media control servers. The method comprises: receiving a service request message; choosing a target channel among all the channels multichannel-cascaded with an opposite cascaded media control server according to the service request message and a preset channel usage rule; and sending information about the determined target channel to the opposite cascaded media control server so as to enable the opposite cascaded media control server to carry out code stream switching according to the information about the target channel. The method disclosed in the embodiments of the present invention saves cascaded channels and improves the utilization of cascaded channels, thereby saving channel resources.

9 Claims, 5 Drawing Sheets

FOREIGN PATENT DOCUMENTS

| | | |
|---|---|---|
| CN | 101110865 A | 1/2008 |
| CN | 101316351 A | 12/2008 |
| CN | 101540872 A | 9/2009 |
| CN | 101540872 B | 7/2012 |
| WO | 92/21187 | 11/1992 |
| WO | 2008/020479 A1 | 2/2008 |

OTHER PUBLICATIONS

Extended Search Report issued in corresponding European Patent Application No. 10 743 419.3; mailed Jul. 6, 2012.

English Translation of claims from corresponding PCT Application No. PCT/CN2010/070662 (including Verification of Translation).

* cited by examiner

METHOD, DEVICE AND SYSTEM FOR CONTROLLING MULTICHANNEL CASCADE BETWEEN TWO MEDIA CONTROL SERVERS

CROSS-REFERENCE TO RELATED APPLICATIONS

This application is a continuation of International Application No. PCT/CN2010/070662, filed on Feb. 11, 2010, which claims priority to Chinese Patent Application No. 200910006999.X, filed on Feb. 23, 2009 and Chinese Patent Application No. 200910133802.9, filed on Mar. 31, 2009, all of which are hereby incorporated by reference in their entireties.

FIELD OF THE INVENTION

The present invention relates to the field of communications, and more particularly, to a method, a device, and a system for controlling multichannel cascade between two media control servers.

BACKGROUND OF THE INVENTION

As broadband networks develop rapidly, video communication systems, especially multipoint conferencing systems, are gaining increasing popularity today. Government agencies, military sectors, public security departments, and businesses are building or expanding their conferencing systems. With the development of video communication technologies and the capacity expansion of video communication systems, a media control server (for example, a multipoint control unit (MCU)) is often cascaded in networking.

In earlier cascade networking, one cascaded channel is available between any two cascaded MCUs, and the cascaded channel can be used to transmit one channel of media signals. For example, one cascaded channel is available between MCU1 and MCU2, terminals T1 and T2 are connected to ports of MCU1; MCU1 could transmit only one channel of video/audio signals of T1 or T2 to the cascaded MCU2, so that a terminal connected to MCU2 can establish video communication with T1 or T2 at the same time. Therefore, such single-channel based cascading cannot be used to implement services such as TV wall and continuous presence, thereby limiting the applications of a multipoint conferencing system. After the multichannel cascade technology emerges, at least two cascaded channels can be established between any two cascaded MCUs. In this way, multiple channels of media signals can be transmitted between the MCUs to implement services such as TV wall and continuous presence.

However, the inventor finds that in the existing multichannel cascade networking structure, there is one-to-one mapping between channels and terminals. If there are many terminals, more cascaded channels are required. In particular, in case of complex cascading, every time an MCU is cascaded, more cascaded channels will be established between any two MCUs. As a result, a huge number of cascaded channels occupy very high bandwidth, thereby wasting considerable bandwidth resources.

SUMMARY OF THE INVENTION

The embodiments of the present invention provide a method, a device, and a system for controlling multichannel cascade between two media control servers to save bandwidth resources.

An embodiment of the present invention discloses a method for controlling multichannel cascade between two media control servers. The method includes:

receiving a service request message;

choosing a target channel from all the channels multichannel-cascaded with an opposite cascaded media control server according to the service request message and a preset channel usage rule; and sending information about the determined target channel to the opposite cascaded media control server so as to enable the opposite cascaded media control server to carry out code stream switching according to the information about the target channel.

An embodiment of the present invention further discloses a device for controlling multichannel cascade between two media control servers. The device includes:

a receiving unit, configured to receive a service request message;

a channel choosing unit, configured to choose a target channel from all the channels multichannel-cascaded with an opposite cascaded media control server according to the received service request message and a preset channel usage rule; and a sending unit, configured to send information about the determined target channel to the opposite cascaded media control server so as to enable the opposite cascaded media control server to carry out code stream switching according to the information about the target channel.

An embodiment of the present invention further discloses a system for controlling multichannel cascade between two media control servers. The system includes: a multichannel-cascaded operation source media control server and an opposite cascaded media control server, where:

the operation source media control server is configured to receive a service request message from a target terminal, choose a target channel from all the channels multichannel-cascaded with the opposite cascaded media control server according to a preset channel usage rule, and send information about the determined target channel to the opposite cascaded media control server so as to enable the opposite cascaded media control server to carry out code stream switching according to the information about the target channel; and the opposite cascaded media control server is configured to receive the information about the determined target channel and carry out the code stream switching according to the preset information about the target channel.

In view of the preceding embodiments, after the preceding method is used for cascaded channels, each cascaded channel can transmit media signals from different terminals at different time. This saves cascaded channels and improves the utilization of cascaded channels, thereby saving channel resources. In addition, corresponding policies are provided to control the preemption of a channel. This further enhances the application and flexibility of multichannel cascade-based conferencing.

BRIEF DESCRIPTION OF THE DRAWINGS

To describe the technical solutions in the embodiments of the present invention or in the prior art more clearly, the following briefly describes the accompanying drawings involved in the embodiments of the present invention or in the prior art. Apparently, the accompanying drawings described below are some embodiments of the present invention, and those skilled in the art can derive other drawings from the accompanying drawings without creative efforts.

DETAILED DESCRIPTION OF THE EMBODIMENTS

To make the preceding objectives, features, and advantages of the present invention easy to understood, the following describes the embodiments of the present invention in details with reference to the accompanying drawings.

Embodiment 1

Figure 1:
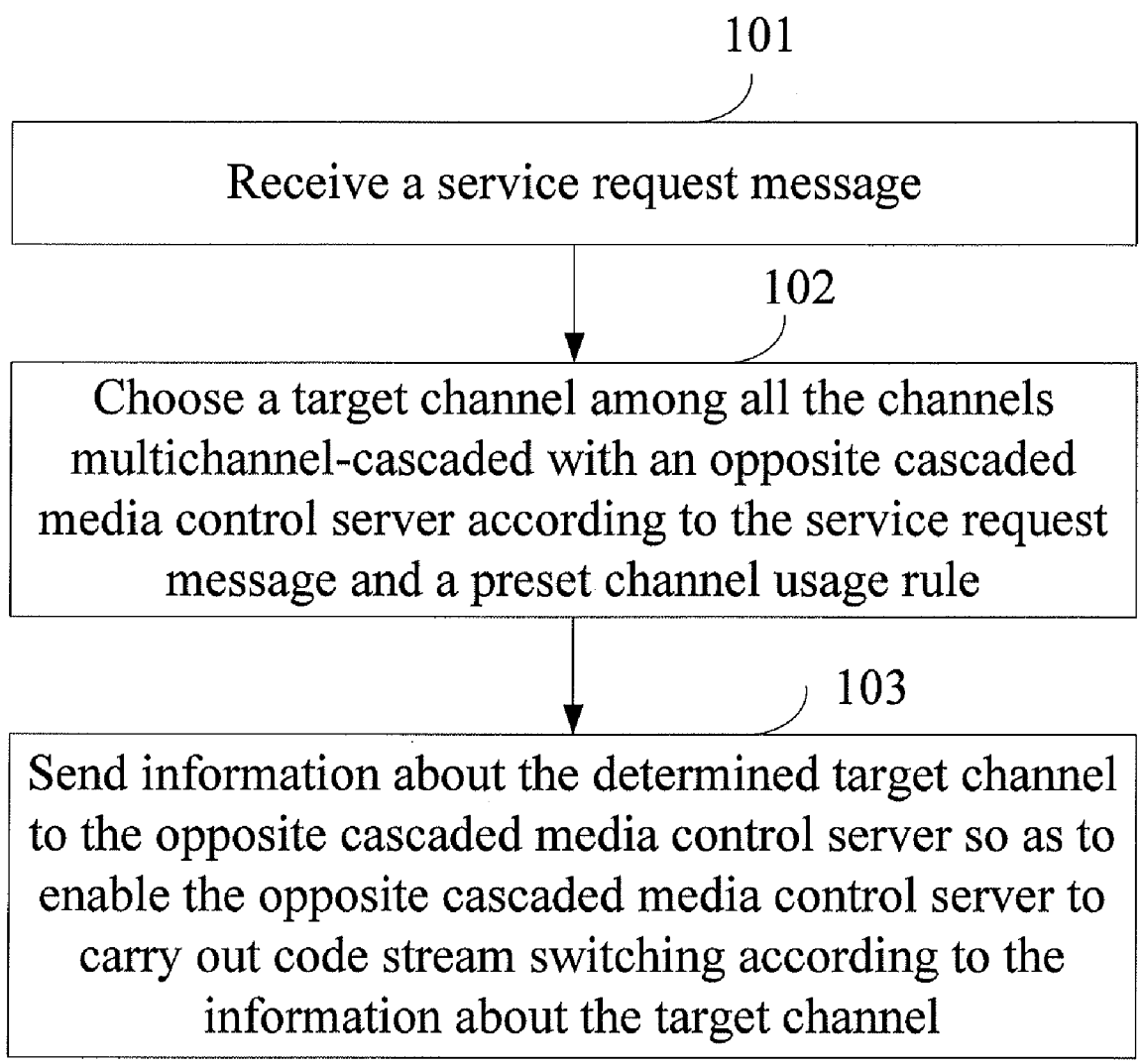
FIG. 1 is a flow chart of a method for controlling multichannel cascade between two media control servers according to Embodiment 1 of the present invention.

See FIG. 1, which is a flow chart of a method for controlling multichannel cascade between two media control servers according to Embodiment 1 of the present invention. The method includes the following steps:

Step 101: Receive a service request message;

Step 102: Choose a target channel from all the channels multichannel-cascaded with an opposite cascaded media control server according to the service request message and a preset channel usage rule, where:

the choosing a target channel according to the preset usage rule may include: judging whether a preset condition for setting a target channel is met; and setting the target channel if the preset condition is met, or preempting a target channel according to a preset preemption rule if the preset condition is not met;

the preset condition for setting a target channel includes: whether a channel among all the channels multichannel-cascaded with the opposite cascaded media control server is transmitting media signals of a target terminal;

and/or whether a channel that is not in use exists among all channels multichannel-cascaded with the opposite cascaded media control server;

the preemption rules include one or more of the following:

(a) choosing a channel whose service type is the same as that of the media signals of the target terminal as the target channel from all the channels multichannel-cascaded;

(b) choosing a channel used by a lower-level media control server as the target channel from all the channels multichannel-cascaded;

(c) presetting service levels for various service types, and choosing a channel of the lowest-level service from all the channels multichannel-cascaded as the target channel; and (d) preempting a channel randomly as the target channel if a critical service is requested.

When more than one of the preceding rules is used as the preemption rules, a priority level can be allocated for each rule; when a condition for a high-priority rule is met, the high-priority rule is directly used as the preemption rule. For example, if the preceding rules (a) and (b) are used as the preemption rules, the priority level set for rule (a) can be higher than the priority level set for rule (b). That is, if a channel whose service type is the same as that of the media signals of the target terminal is available, the channel is directly chosen as the target channel; if a channel whose service type is the same as that of the media signals of the target terminal is unavailable, the channel used by a lower-level media control server is chosen as the target channel from all the channels multichannel-cascaded with the opposite cascaded media control server.

In the preceding examples, the preemption rules include two rules. If the preemption rules include three or more rules, a method similar to the preceding method can be used, which is not described here.

Step 103: Send information about the determined target channel to the opposite cascaded media control server so as to enable the opposite cascaded media control server to carry out code stream switching according to the information about the target channel, where:

the information about the target channel includes an identifier (ID) of the target channel, a service type set for the target channel, a type of the data code stream, and an ID of a conference terminal corresponding to the data code stream so as to enable the opposite cascaded media control server to carry out code stream switching according to the information about the target channel;

the information about the target channel may also include a device ID of the operation source media control server and a level of the media control server.

In view of the preceding embodiment of the present invention, after the preceding method is used for cascaded channels, each cascaded channel can transmit media signals from different terminals at different time. This saves cascaded channels and improves the utilization of cascaded channels, thereby saving channel resources. In addition, corresponding policies are provided to control the preemption of a channel. This further enhances the application and flexibility of multichannel-cascade based conferencing.

Embodiment 2

Figure 2:
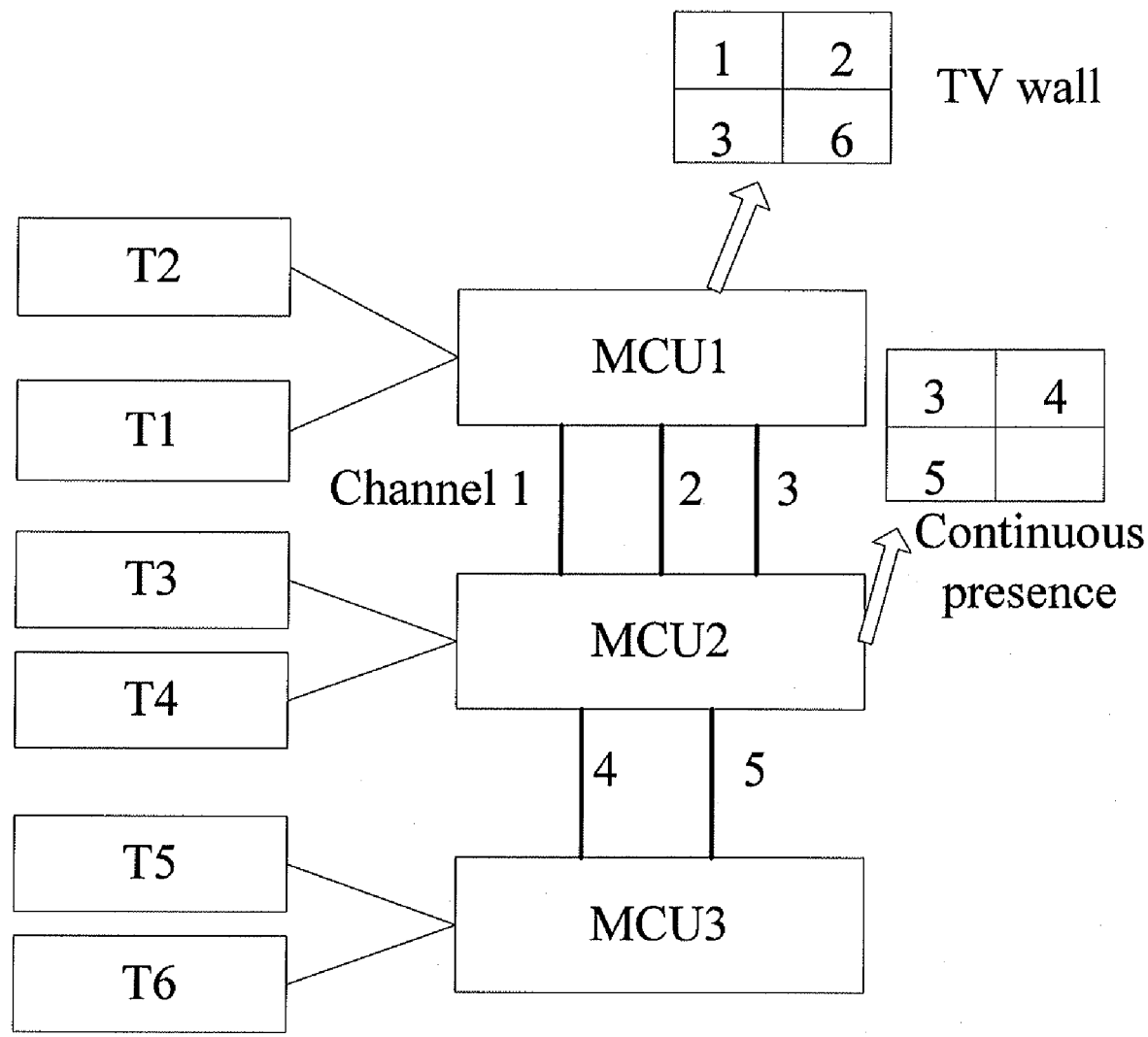
FIG. 2 is a structural schematic diagram of three-level cascade networking provided in the present invention.
Figure 3:
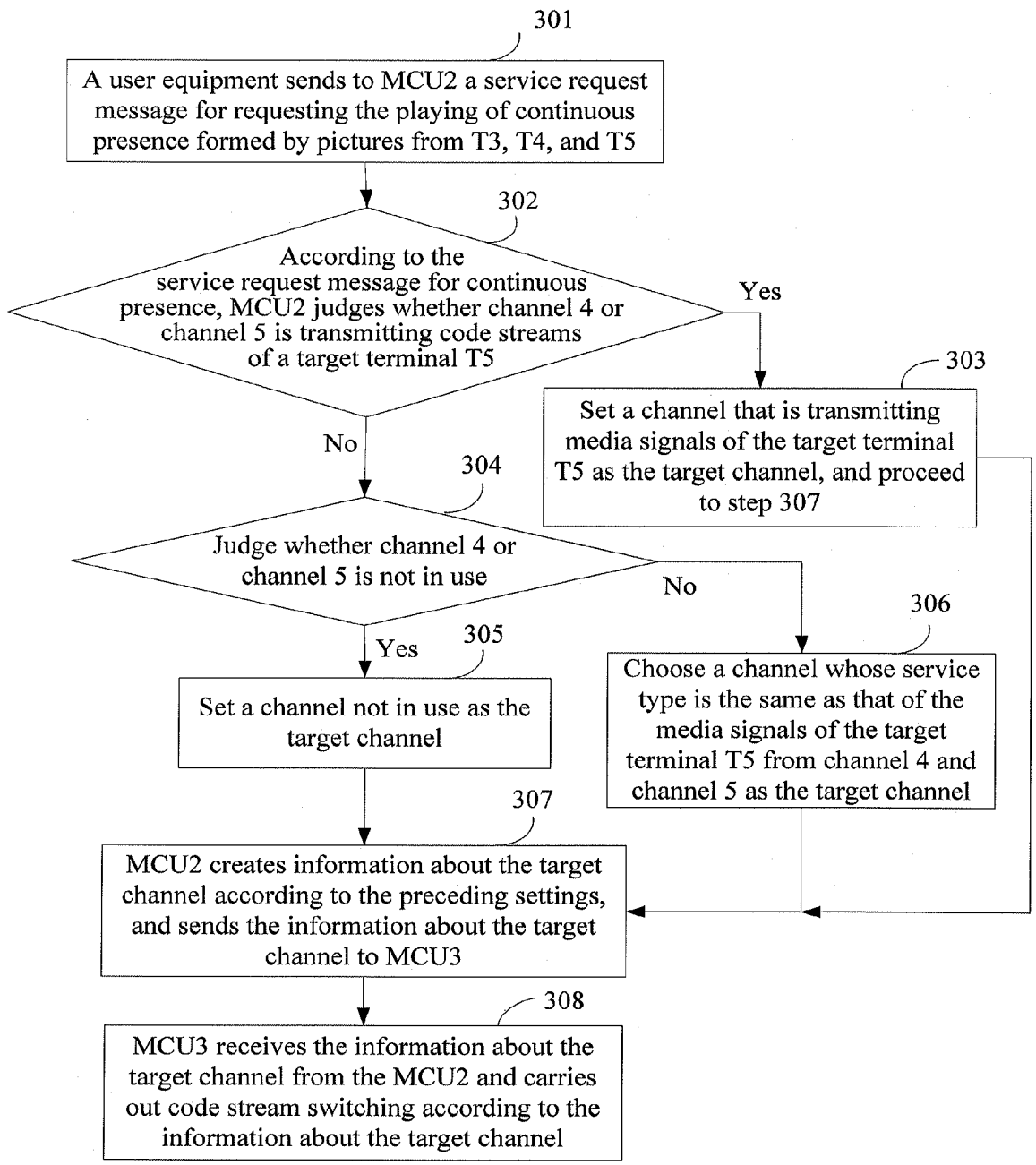
FIG. 3 is a flow chart of a method for controlling multichannel cascade between two media control servers according to Embodiment 2 of the present invention.

See FIG. 2, which is a structural schematic diagram of three-level cascade networking. In addition, FIG. 2 can also be deemed a part of complex cascade networking (the MCUs in FIG. 2 can also cascade other MCUs through multichannel cascading and be connected to more conference terminals, and more cascaded channels can be established between the MCUs). In a specific conference, the involved MCUs and conference terminals are marked with M and T numbers; in FIG. 2, before a conference starts, IDs 1, 2, and 3 are respectively allocated for MCU1, MCU2, and MCU3, and M and T numbers are allocated for all the terminals under each MCU. The <M, T> mark of T1 is <1, 1>, and that of T2 is <1, 2>; the <M, T> mark of T3 under MCU2 is <2, 1>, and that of T4 under MCU2 is <2, 2>; the <M, T> mark of T5 under MCU3 is <3, 1>, and that of T6 under MCU3 is <3, 2>. See FIG. 3 in combination with the structural diagram of the three-level cascade networking shown in FIG. 2. FIG. 3 is a flow chart of a method for controlling multichannel cascade between two media control servers according to Embodiment 2 of the present invention. Taking the three-level cascade networking shown in FIG. 2 as an example, this embodiment describes a method for controlling multichannel cascade between two media control servers, where the media control server is an MCU. In this embodiment of the present invention, there is no one-to-one mapping between a channel and a terminal, and no application is specified for each cascaded channel; that is, each cascaded channel can be used to transmit media signals of continuous presence, TV wall, video, and other service applications. When the user equipment submits a service operation request, each cascaded channel needs to be controlled, and a channel needs to be specified for transmitting media signals of a service requested by the user equipment. Specifically, the method includes the following steps:

Step 301: A user equipment sends to MCU2 a service request message for requesting the setting of the continuous presence service, that is, to request playing of continuous presence formed by the pictures from T3, T4, and T5.

Here, for ease of description, the three channels between MCU1 and MCU2 are respectively named channel 1, channel 2 and channel 3, and channel 1, channel 2 (the word "channel" is not shown in FIG. 2), and channel 3 (the word "channel" is not shown in FIG. 2) are set as level-1 cascaded channel; the two channels between MCU2 and MCU3 are respectively named channel 4 and channel 5, and these channels are set as level-2 cascaded channel; T3, T4 and T5 are the target terminals of the continuous presence service. The user equipment can be a device or system that initiates the service operation, a terminal or service management console connected to the MCU, or a processing module inside the MCU.

Step 302: According to the service request message for continuous presence, MCU2 judges whether channel 4 or channel 5 is transmitting code streams of the target terminal T5. If channel 4 or channel 5 is transmitting code streams of the target terminal T5, proceed to step 303; if channel 4 or channel 5 is not transmitting code streams of the target terminal T5, proceed to step 304.

The specific process for MCU2 to judge whether channel 4 or channel 5 is transmitting media signals of the target terminal T5 is as follows: MCU2 judges whose data is being transmitted by channel 4 and channel 5 according to M and T numbers corresponding to data streams transmitted over channel 4 and channel 5. For example, MCU2 records the terminals whose data is transmitted by channel 4 and channel 5. If it is judged that the <M, T> mark corresponding to the code stream transmitted over channel 4 under MCU3 is <3, 1>, it indicates that channel 4 is transmitting media code streams of the target terminal T5.

Step 303: Set a channel that is transmitting media signals of the target terminal T5 as the target channel, and then proceed to step 307.

When either channel 4 or channel 5 is transmitting the media signals of the target terminal T5, the channel is set as the target channel; when both channel 4 and channel 5 are transmitting the media signals of the target terminal T5, either of them is chosen as the target channel.

Step 304: Judge whether channel 4 or channel 5 is currently not in use; if channel 4 or channel 5 is currently not in use, proceed to step 305; if both channel 4 and channel 5 are currently in use, proceed to step 306.

Whether channel 4 or channel 5 is currently not in use can be judged based on information about the media code streams transmitted over the channels recorded in MCU3. MCU3 stores corresponding ID information. When a channel is in use, the corresponding ID is 1; when a channel is not in use, the corresponding ID is 0. In this way, whether a channel is not in use can be judged by obtaining the usage ID of the channel recorded by MCU3.

Step 305: Set the channel not in use as the target channel, and then proceed to step 307.

If either channel 4 or channel 5 is not in use, the channel is set as the target channel; if both channel 4 and channel 5 are not in use, either of them is chosen as the target channel.

Step 306: Choose a channel whose service type is the same as that of the media signals of the target terminal T5 from channel 4 and channel 5 as the target channel, and then proceed to step 307.

MCU2 records the M and T numbers of the terminal corresponding to the media signals transmitted over each channel and the identification bit of the service information corresponding to the media signals transmitted over the channel. For example, the following service information can be set for media signals: continuous presence, TV wall, and video, and two bits can be used to indicate a service type. In this case, the identification bits corresponding to the continuous presence, TV wall, and video services can be respectively set to 01, 10, and 11. If the <M, T> mark of the target terminal of the media signals transmitted over channel 5 is recorded as <3, 2> in MCU3, and the identification bits of the type of the service transmitted over channel 5 are recorded as 01, it indicates that the service type of channel 5 is the same as that of the media signals of the target terminal T5. In this case, channel 5 can be chosen as the target channel. If both channel 4 and channel 5 are being used, the channel whose service type is the same as that of the media signals of the target terminal T5 is chosen as the target channel. For example, if the service type of the media signals transmitted over channel 4 is also continuous presence, channel 4 is set as the target channel. The service types may include: continuous presence, TV wall, and video.

Alternatively, a channel of a lower cascade level can also be chosen from channel 4 and channel 5 as the target channel. For example, if the media signals transmitted over channel 4 are used for the TV wall on MCU1 and the media signals transmitted over channel 5 are used for the service operations on MCU2, because MCU1 is of a higher level than MCU2, and channel 4 is of a higher level than channel 5, channel 5 is chosen as the target channel.

Alternatively, the service levels can be preset, and then the channel transmitting a lower level of service can be chosen from channel 4 and channel 5 as the target channel. For example, the service level of continuous presence can be preset to be higher than the service level of TV wall. In this case, if channel 4 transmits the data of the continuous presence service and channel 5 transmits the data of the TV wall service, channel 5 is chosen as the target channel.

Alternatively, one channel can be randomly chosen from channel 4 and channel 5 as the target channel, which does not affect the implementation of the solution.

Step 307: MCU2 creates information about the target channel according to the preceding settings, and sends the information about the target channel to MCU3.

The information about the target channel includes:

ID of the target channel: It indicates the number of the channel that is set as the target channel among multiple channels. In this embodiment, the ID of the target channel is 4, indicating that channel 4 is set as the target channel.

ID of the conference terminal corresponding to the data code stream: It indicates the conference terminal whose code stream is transmitted over the target channel. In this embodiment, channel 4 transmits the data of the conference terminal T5, and therefore <M, T> mark is <2, 5>.

Service type set for the target channel: It indicates the service type of the data transmitted over the target channel. In this embodiment, the service type is continuous presence.

Type of the data code stream (primary stream, secondary stream, or other stream): It indicates the type of the data code stream transmitted over the target channel, which can be primary stream, secondary stream, or other stream.

Step 308: MCU3 receives the information about the target channel from MCU2 and then carries out code stream switching according to the information about the target channel.

MCU3 sends the code stream of the terminal T5 to channel 4 as primary stream for the continuous presence service according to the ID of the target channel, the service type set for the target channel, the type of data code stream, and the ID of the conference terminal corresponding to the data code stream carried in the information about the target channel.

It should be noted that the information about the target channel may further include: a device ID of the operation source media control server and a level of the media control server.

The device ID of the operation source media control server indicates the media control server that performs the setting operation, so that the opposite cascaded media control server can return the operation response message to the operation source media control server. In this embodiment, the media control server is an MCU, so the device ID of the media control server is the M number of the MCU; the M number is 2, indicating that the setting operation is performed by MCU2. After carrying out code stream switching, MCU3 returns the operation result to the operation source control server MCU2 indicated by the device ID of the operation source media control server.

An MCU level identifies a level of an MCU. It can be configured based on the cascade relationship or specified by the user. For example, the highest level of the MCU is 100, which decreases at a step of 10 for other lower-level MCUs. In this embodiment, the level of MCU1 is 100, that of MCU2 is 90, and that of MCU3 is 80.

Specifically, choosing a target channel includes the following steps:

(1) Judge whether a channel is transmitting the media signals of the target terminal; if the channel is transmitting the media signals of the target terminal, directly setting the channel as the target channel.

(2) If no channel is transmitting the media signals of the target terminal, judging whether a channel is not in use; if there is a channel not in use, setting the channel not in use as the target channel (if multiple channels are not in use, choosing one of them randomly).

(3) If no channel is not in use, preempting a channel as the target channel according to the preset preemption rules. The preemption rules include:

A. choosing a channel whose service type is the same as that of the media signals of the target terminal as the target channel;

B. choosing a channel used by a lower-level media control server from all the channels multichannel-cascaded with an opposite cascaded media control server as the target channel; and C. choosing a channel of the lowest-level service from all the channels multichannel-cascaded with an opposite cascaded media control server as the target channel. It is to be understood that the preceding embodiments are preferred embodiments. The present invention can also be implemented through other embodiments. For example, if the source terminal sending a service request for requesting a service of the highest priority, the target channel can be preempted directly rather than making the judgment in steps (1) and (2) described in the preceding embodiments. In addition, if the source conference terminal sending a service request is of a lower priority or requests a lower-priority service, it is possible that no channel can be preempted as the target channel. In this case, the source conference terminal can send the request to the conference management console, which arranges the required resources and allocates the corresponding channel to the source conference terminal as the target channel. It is impossible to list all the embodiments of the present invention, so other processes that can be directly or indirectly anticipated based on the preceding embodiments fall within the protection scope of the present invention.

It should be noted that the result of setting a target channel can be displayed in this embodiment. For example, a topology of multiple channels can be created, which can be displayed graphically or in other manner.

In view of the embodiments of the present invention, after the preceding method is used for controlling the use of cascaded channels, each cascaded channel can transmit media signals from different terminals at different time. This saves cascaded channels and improves the utilization of cascaded channels, thereby saving channel resources. In addition, corresponding policies are provided to control the preemption of a channel. This further enhances the application and flexibility of multichannel-cascade based conferencing.

The solution may further include displaying the result of the multichannel control, so as to visually present information about the multiple channels between the MCUs visually.

Embodiment 3

Figure 4:
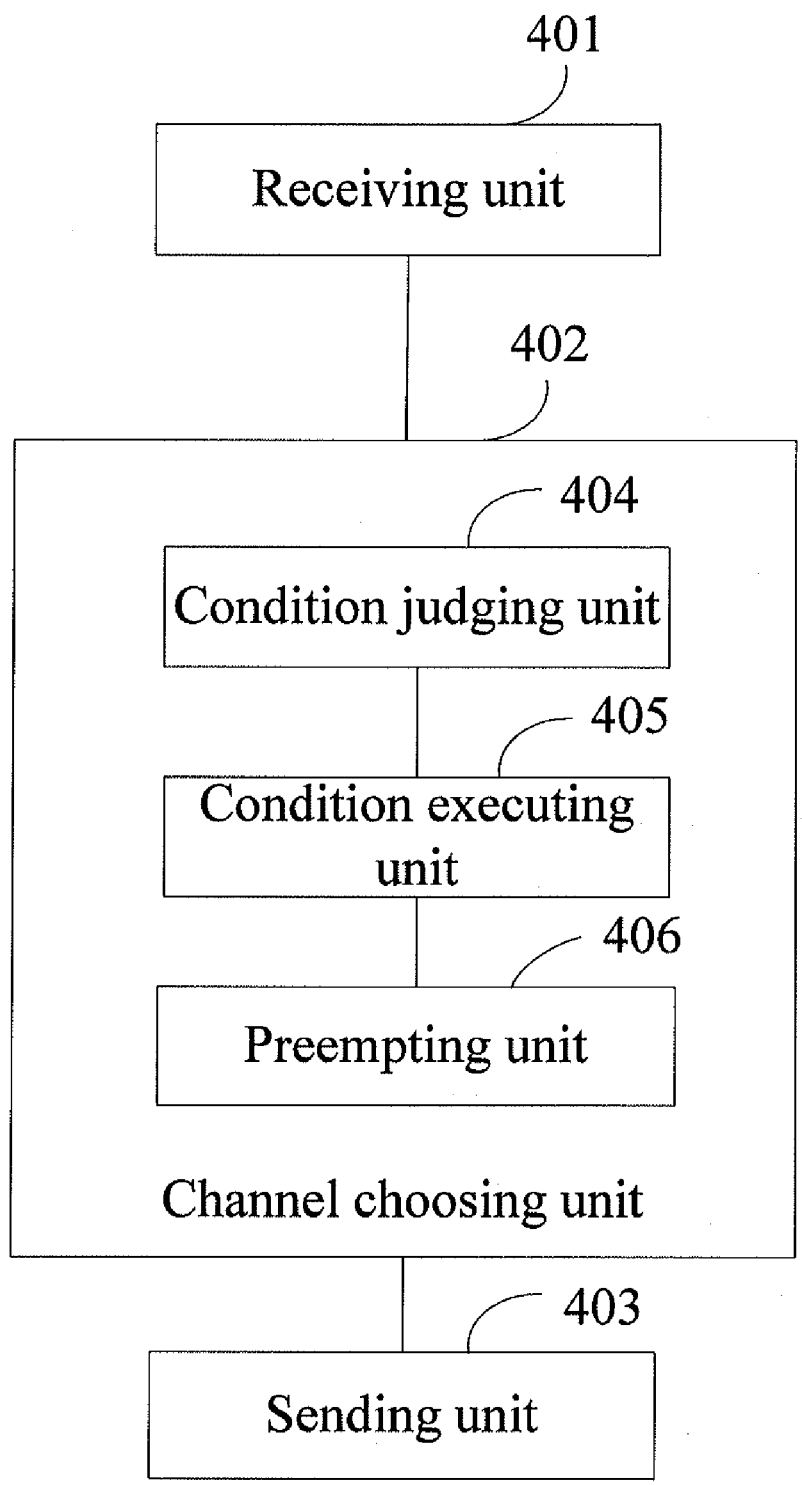
FIG. 4 is a structural diagram of a device for controlling multichannel cascade between two media control servers according to Embodiment 3 of the present invention.

To cater to the preceding multichannel control method, an embodiment of the present invention further provides a device for controlling multichannel cascade between two media control servers. See FIG. 4, which is a structural diagram of a device for controlling multichannel cascade between two media control servers according to Embodiment 3 of the present invention. The device includes a receiving unit 401, a channel choosing unit 402, and a sending unit 403. The following describes in detail the internal structure and connection relationship of the device in combination with the operating principle of the device.

The receiving unit 401 is configured to receive a service request message.

The service request message may come from a conference terminal, a corresponding conference management console, or an internal unit of a corresponding media control server.

The channel choosing unit 402 is configured to choose a target channel from all the channels multichannel-cascaded with an opposite cascaded media control server according to a preset channel usage rule.

The sending unit 403 is configured to send information about the determined target channel to the opposite cascaded media control server so as to enable the opposite cascaded media control server to carry out code stream switching according to the information about the target channel.

Preferably, the channel choosing unit 402 may include a condition judging unit 404, a condition executing unit 405, and a preempting unit 406, wherein:

the condition judging unit 404 is configured to judge whether a preset condition for setting a target channel is met. If a preset condition for setting a target channel is met, the condition executing unit sets a target channel; if a preset condition for setting a target channel is not met, the preempting unit 406 preempts a target channel;

the condition executing unit 405 is configured to set a target channel after the condition judging unit 404 judges that the preset condition for setting a target channel is met; and the preempting unit 406 is configured to preempt a target channel according to a preset preemption rule after the condition judging unit 404 judges that the preset condition for setting a target channel is not met.

The preset condition for setting a target channel includes:

(1) whether any channel among all the channels multichannel-cascaded with an opposite cascaded media control server is transmitting the media signals of the target terminal;

(2) whether any channel among all the channels multichannel-cascaded with an opposite cascaded media control server is not in use.

It can be understood that the preceding conditions may exist separately or be combined. If the preceding conditions are combined, that is, a channel among all the channels multichannel-cascaded with an opposite cascaded media control server is transmitting the media signals of the target terminal and another channel among such channels is not in use, a target channel can be chosen by the user equipment or based on the resource-saving principle.

When the preset condition is not met, the preempting unit 406 preempts a target channel according to the preset preemption rule. The preemption rule includes:

(1) choosing a channel whose service type is the same as that of the media signals of the target terminal as the target channel from all the channels multichannel-cascaded with an opposite cascaded media control server;

(2) choosing a channel used by a lower-level media control server as the target channel from all the channels multichannel-cascaded with an opposite cascaded media control server;

(3) presetting service levels for various service types, and choosing a channel of the lower-level service as the target channel from all the channels multichannel-cascaded with an opposite cascaded media control server; and (4) preempting a channel randomly as the target channel if a critical service is requested.

It can be understood that the preemption rules may exist separately or be combined. When the preceding conditions are combined, a channel can be preempted based on certain criteria or conditions, for example:

a. If a channel whose service type is the same as that of the media signals of the target terminal is available, and the channel is transmitting the media data of a lower-level media control server, the channel can be preempted as the target channel;

b. If a channel whose service type is the same as that of the media signals of the target terminal is unavailable, but a channel among all the channels multichannel-cascaded with an opposite cascaded media control server is transmitting a lower-level service, the channel transmitting the lower-level service can be preempted as the target channel; and c. If a channel is used by a lower-level media control server from all the channels multichannel-cascaded with an opposite media control server and the channel is transmitting a lower-level service, the channel can be preempted as the target channel.

The preceding three examples describe three common preemption rules. It can be understood that those skilled in the art can derive other preemption rules from a combination of the preceding preemption rules.

The embodiment of the present invention may further include a displaying unit for displaying the result of the multichannel control.

In view of the preceding embodiment, after the preceding device is used for controlling the use of cascaded channels, each cascaded channel can transmit media signals from different terminals at different time. This saves cascaded channels and improves the utilization of cascaded channels, thereby saving channel resources. In addition, corresponding policies are provided to control the preemption of a channel. This further enhances the application and flexibility of multichannel-cascade based conferencing.

The solution may further include displaying the result of the multichannel control, so as to visually present information about the multiple channels between the MCUs visually.

Embodiment 4

Figure 5:
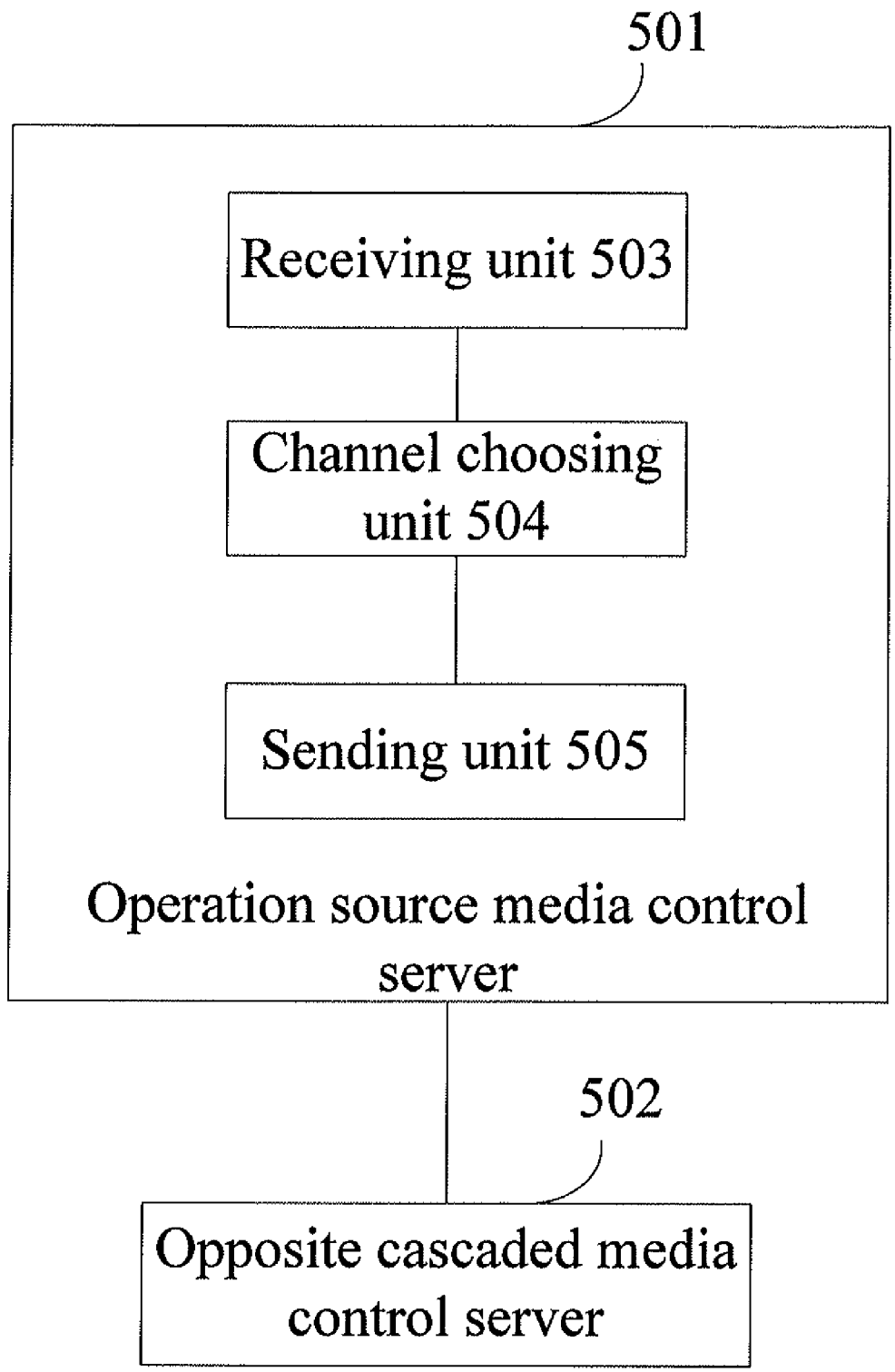
FIG. 5 is a structural diagram of a system for controlling multichannel cascade between two media control servers according to Embodiment 4 of the present invention.

An embodiment of the present invention further provides a system for controlling multichannel cascade between two media control servers. See FIG. 5, which is a structural diagram of a system for controlling multichannel cascade between two media control servers according to Embodiment 4 of the present invention. The system includes a multichannel-cascaded operation source media control server 501 and an opposite cascaded media control server 502, wherein:

the operation source media control server 501 is configured to receive a service request message from a target terminal, choose a target channel from all the channels multichannel-cascaded with the opposite cascaded media control server according to a preset channel usage rule, and send information about the determined target channel to the opposite cascaded media control server so as to enable the opposite cascaded media control server to carry out code stream switching according to the information about the target channel; and the opposite cascaded media control server 502 is configured to receive the information about the determined target channel and carry out the code stream switching according to the preset information about the target channel.

The operation source media control server 501 includes:

a receiving unit 503, configured to receive the service request message;

a channel choosing unit 504, configured to choose the target channel from all the channels multichannel-cascaded with the opposite cascaded media control server according to the preset channel usage rule; and a sending unit 505, configured to send the information about the determined target channel to the opposite cascaded media control server so as to enable the opposite cascaded media control server to carry out the switching according to the information about the target channel.

In view of the preceding embodiments, after the preceding system is used for controlling the use of cascaded channels, each cascaded channel can transmit media signals from different terminals at different time. This saves cascaded channels and improves the utilization of cascaded channels, thereby saving channel resources. In addition, corresponding policies are provided to control the preemption of a channel. This further enhances the application and flexibility of multichannel-cascade based conferencing.

It can be understood by those skilled in the art that all or some processes of the method provided in the preceding embodiments can be implemented by a program instructing relevant hardware; the program can be stored in a readable storage medium such as a Read-Only Memory(ROM), a Random Access Memory (RAM), a compact disk, or an optical disk.

A method, a device, and a system for controlling multichannel cascade between two media control servers are detailed above. The principle and implementation of the present invention are described through specific embodiments. The preceding embodiments are intended to help understand the method and core idea of the present invention. In addition, it will be apparent to those skilled in the art that changes may be made to the implementation and application scope of the preceding embodiments without departing from the principles of the present invention. To sum up, the present invention is not limited to the disclosed embodiments.

What is claimed is:

1. A method for controlling multichannel cascade between two media control servers, comprising:

receiving a service request message;

choosing a target channel from all the channels multichannel-cascaded with an opposite cascaded media control server according to the service request message and a preset channel usage rule; and sending information about the determined target channel to the opposite cascaded media control server so as to enable the opposite cascaded media control server to carry out code stream switching according to the information about the target channel;

wherein choosing a target channel from all the channels multichannel-cascaded with the opposite cascaded media control server according to the preset channel usage rule comprises:

determining whether a preset condition for setting a target channel is met; and if the preset condition for setting a target channel is met, setting a target channel; if the preset condition for setting a target channel is not met, preempting a target channel according to a preset preemption rule.

2. The method according to claim 1, wherein the preset condition for setting a target channel comprises at least one of:

whether a channel among all the channels multichannel-cascaded with the opposite cascaded media control server is transmitting media signals of a target terminal; and whether a channel among all the channels multichannel-cascaded with the opposite cascaded media control server is not in use.

3. The method according to claim 1, wherein the preemption rule comprises one or more of the following:

choosing a channel whose service type is the same as that of the media signals of the target terminal as the target channel from all the channels multichannel-cascaded with the opposite cascaded media control server;

choosing a channel used by a lower-level media control server as the target channel from all the channels multi-channel-cascaded with the opposite cascaded media control server;

presetting service levels for various service types, and choosing a channel of the lowest-level service as the target channel from all the channels multichannel-cascaded with the opposite cascaded media control server; and preempting a channel randomly as the target channel if a critical service is requested.

4. The method according to claim 1, wherein the information about the target channel may also comprise: an ID of the target channel, a service type set for the target channel, a type of a data code stream, and an ID of a conference terminal corresponding to the data code stream.

5. The method according to claim 1, wherein the information about the target information further comprises a device ID of an operation source media control server and a level of the media control server.

6. A device for controlling multichannel cascade between two media control servers, comprising:

a receiving unit, configured to receive a service request message;

a channel choosing unit, configured to choose a target channel from all the channels multichannel-cascaded with an opposite cascaded media control server according to the received service request message and a preset channel usage rule; and a sending unit, configured to send information about the determined target channel to the opposite cascaded media control server so as to enable the opposite cascaded media control server to carry out code stream switching according to the information about the target channel;

wherein the channel choosing unit comprises:

a condition judging unit, configured to determining whether a preset condition is met:

a condition executing unit, configured to set a target channel after the condition judging unit determines that the preset condition is met; and a preempting unit, configured to preempt a target channel according to a preset preemption rule after the condition judging unit judges that the preset condition is not met.

7. The device according to claim 6, wherein the preset condition comprises at least one of:

whether any channel among all the channels multichannel-cascaded with the opposite cascaded media control server is transmitting media signals of a target terminal; and whether any channel among all the channels multichannel-cascaded with the opposite cascaded media control server is not in use.

8. The device according to claim 6, wherein the preemption rule comprises one or more of the following:

choosing a channel whose service type is the same as that of the media signals of the target terminal as the target channel from all the channels multichannel-cascaded with the opposite cascaded media control server;

choosing a channel used by a lower-level media control server as the target channel from all the channels multi-channel-cascaded with the opposite cascaded media control server;

presetting service levels for various service types, and choosing a channel of the lowest-level service as the target channel from all the channels multichannel-cascaded with the opposite cascaded media control server; and preempting a channel randomly as the target channel if a critical service is requested.

9. A system for controlling multichannel cascade between two media control servers, comprising a multichannel-cascaded operation source media control server and an opposite cascaded media control server, wherein:

the operation source media control server is configured to receive a service request message from a target terminal, determine whether a preset condition for setting a target channel is met, set a target channel if the preset condition for setting a target channel is met, preempting a target channel according to a preset preemption rule if the preset condition for setting a target channel is not met and send information about the determined target channel to the opposite cascaded media control server so as to enable the opposite cascaded media control server to carry out code stream switching according to the information about the target channel; and the opposite cascaded media control server is configured to receive the information about the determined target channel and carry out the code stream switching according to the preset information about the target channel.

* * * * *